May 5, 1970 R. W. BUNDY ET AL 3,510,038
PROCESS AND APPARATUS FOR HANDLING FIBROUS ELEMENTS
FORWARDED IN FLUID STREAMS
Original Filed July 1, 1963 5 Sheets-Sheet 1

INVENTORS
ROBERT WENDEL BUNDY
THOMAS MELVIN SHEETS

BY *Sol Schwartz*

ATTORNEY

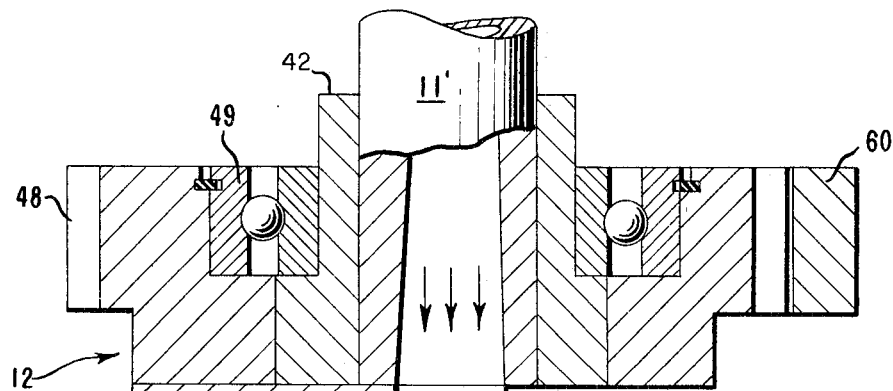
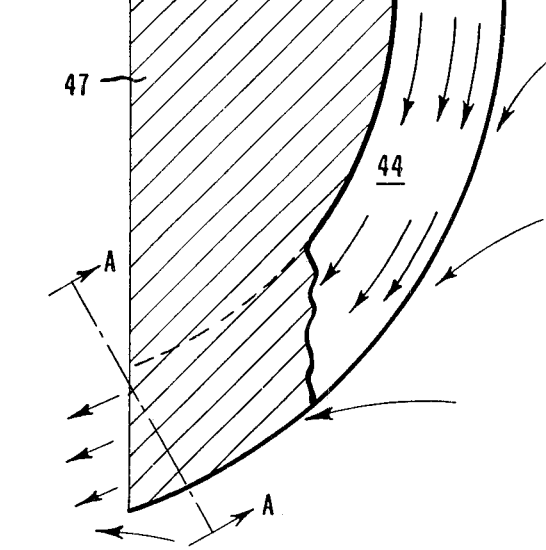
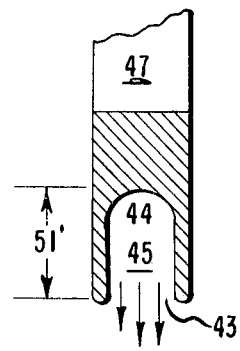
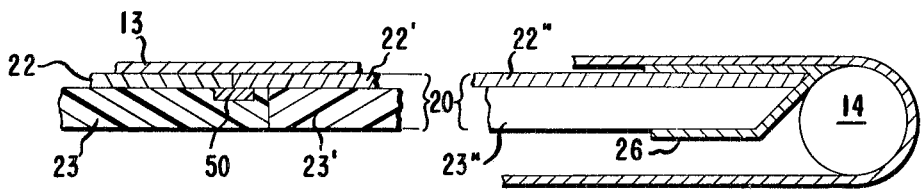
INVENTORS
ROBERT WENDEL BUNDY
THOMAS MELVIN SHEETS
BY *Sol Schwartz*
ATTORNEY

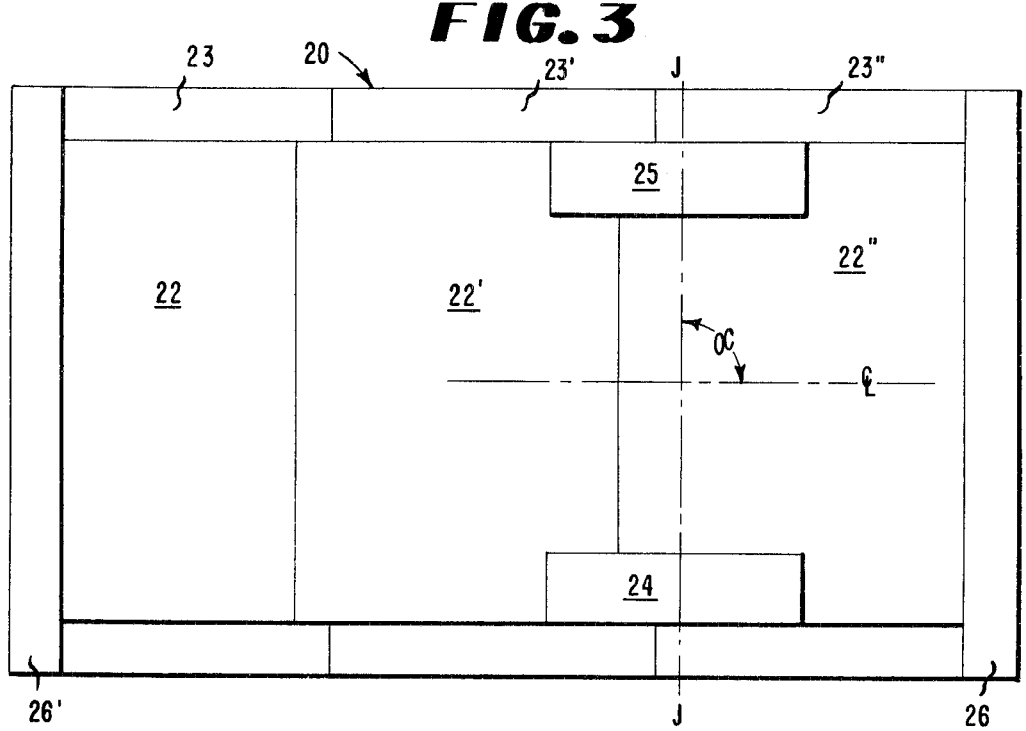
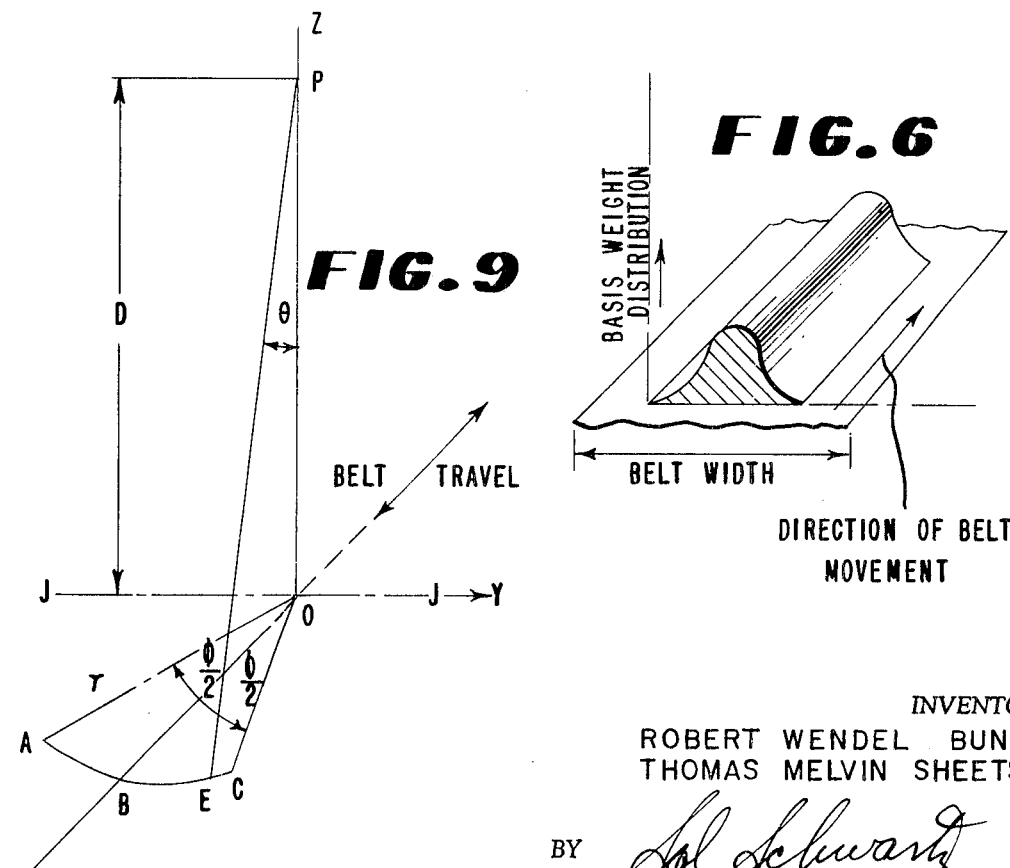

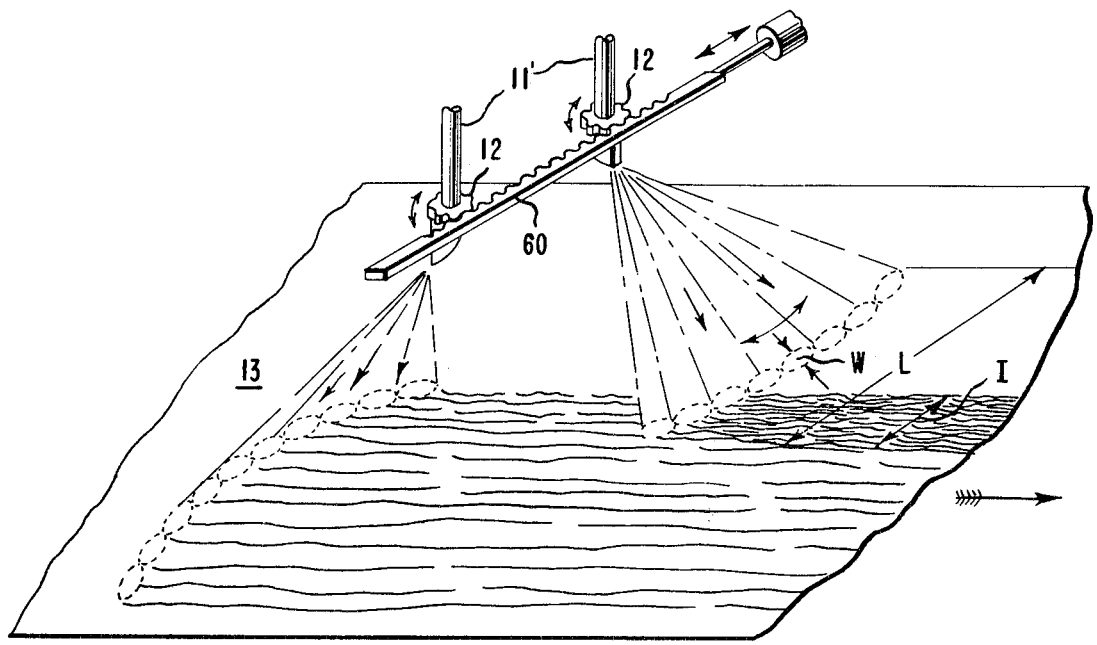

United States Patent Office 3,510,038
Patented May 5, 1970

3,510,038
PROCESS AND APPARATUS FOR HANDLING FIBROUS ELEMENTS FORWARDED IN FLUID STREAMS
Robert Wendel Bundy, Nashville, Tenn., and Thomas Melvin Sheets, Newark, Del., assignors to E. I. du Pont de Nemours and Company, Wilmington, Del., a corporation of Delaware
Original application July 1, 1963, Ser. No. 291,904, now Patent No. 3,296,678, dated Jan. 10, 1967. Divided and this application Nov. 7, 1966, Ser. No. 592,607
Int. Cl. B65h 54/00
U.S. Cl. 226—7                                    4 Claims

ABSTRACT OF THE DISCLOSURE

A process and apparatus for handling fibrous elements being forwarded in fluid streams to a collecting device wherein the fiber containing fluid streams are diverted and oscillated in a regular pattern for collection by a curved peripheral surface which may be moved in an oscillating or rotating manner.

CROSS REFERENCE TO RELATED APPLICATION

Figure 1:
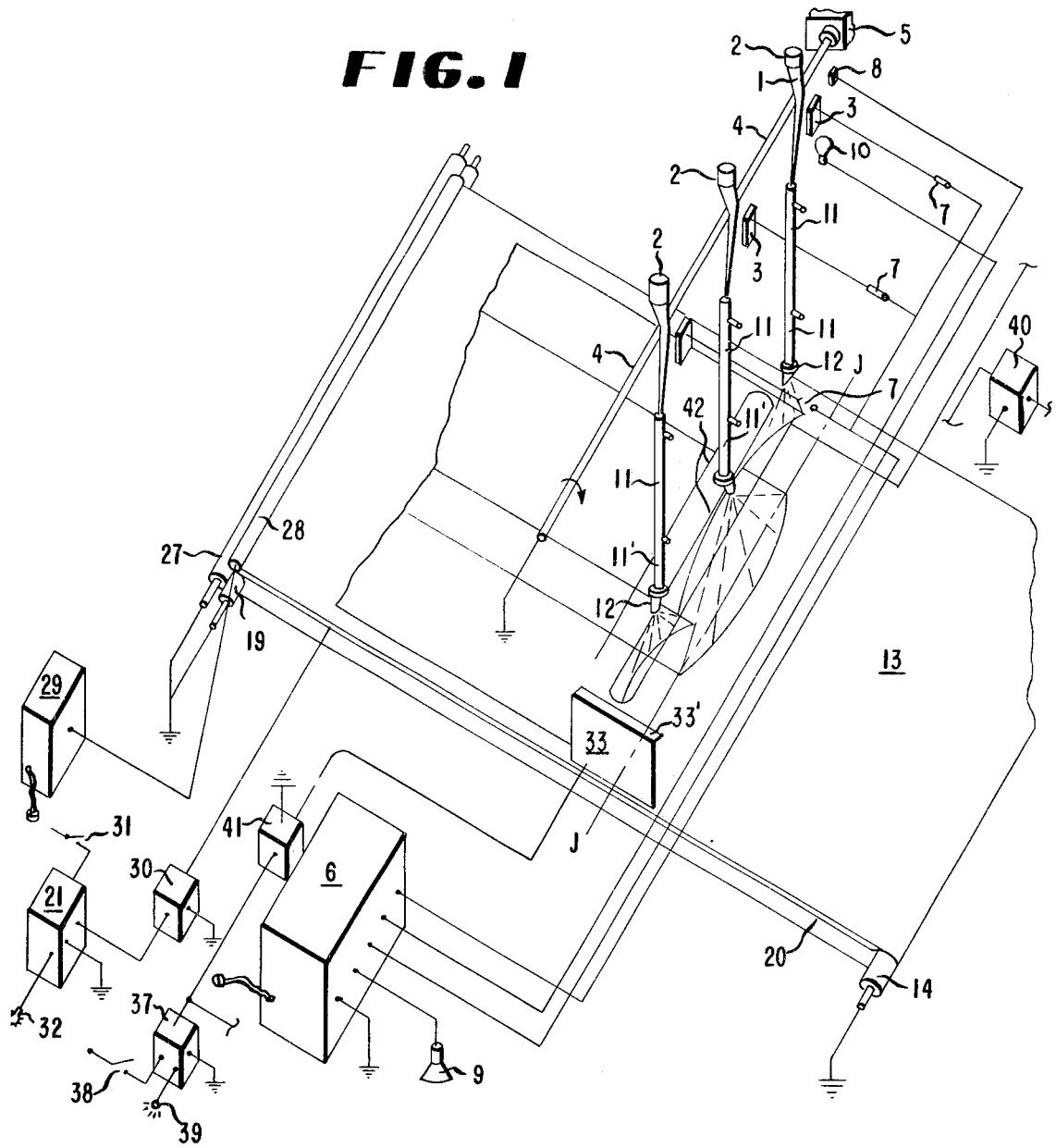

This application is a division of application Ser. No. 291,904, filed July 1, 1963 and now U.S. Pat. No. 3,296,678 issued Jan. 10, 1967.

This case relates to novel improved process and apparatus for handling continuously forwarded fibrous elements, especially those in the form of continuous filaments and preferably continuous filaments of synthetic organic polymeric material, which process and apparatus preferably provides for laying down a plurality of these filaments upon a collecting surface to form a web of uniform thickness and properties comprised of the fibrous elements arranged in random nonparallel array, and still more especially, such webs of substantially wide width.

In the following specification and in the claims, the term "fibrous elements" is intended to include any filamentary material of the types appropriate to the textile art, these including any fibril, fibrid, fiber, filament, thread, yarn, or filamentary structure, regardless of length, diameter, or composition, although in preferred form the invention relates particularly to such materials in the form of continuous filaments and more especially to synthetic organic polymeric fibrous materials.

The term "web" includes mats, batts, nonwoven pile fabrics, and other interfelted, interentangled, or commingled fibrous products which may generally be described as coherent sheets of entangled fibers made without the fibers first being spun into yarns and the yarns later interlaced by weaving, knitting, braiding, or other means of yarn manipulation in which the ends of yarns of finite length must be handled and intertwined.

The production of nonwoven webs of fibrous elements is an activity of growing commercial importance. These webs not only permit attainment of textile structures having properties equivalent to previously known fabrics of the woven and felted types and at a considerably lower cost, but also permit reaching hitherto unattainable structures having desirable properties and combinations of properties in terms of end use function and aesthetics.

It has been the experience of those skilled in the art that achieving a given desirable nonwoven web structure requires controlling a large number of variables. Furthermore, it has been found that the controlling parameters in their desirable ranges more often than not are mutually exclusive; attaining one object in full often seems to require missing another object completely. As a result, the nonwoven structures known in the present state of the art are the result of prudent compromises in balancing one set of objects against another.

For example, it has long been known that uniformity of laydown of individual elements in a web of randomly arrayed elements is the most important parameter in limiting directionality of physical properties in the final web. It further has long been known that the better the uniformity level of a given web, the more economical it is to employ that web in an end product for if strength in any given web direction be the sought-for property, the average strength selected must be such that the minimum strength exceeds the requirement. Thus the greater the variation the greater the average required, and the less economically employed is the web.

Attaining this highly desirable uniformity, however, has not previously been achieved apparently because of a lack of knowledge as to means for attaining this uniformity or because the available means were so prohibitively expensive as to preclude economical production of the nonwoven product.

These problems are particularly difficult when forming webs of substantially wide widths. These may be defined as webs exceeding in width about 24 inches, and more usually extending well above that figure. There exists, in fact, considerable demand for wide webs in sizes up to 15 feet and even wider. The problem in laying down a wide web largely results from the fact that the types of devices employed to produce the fibrous elements are of such a nature that a web of wide width requires the combining of a plurality of such devices. Furthermore, even where it is possible to build a source of fibrous elements capable of producing a sufficient multiplicity of elements to lay down such a wide web, it has been found that, with the vastly increased dimensions of the source, or fibrous element supply means, the uniformity of distribution has declined, defeating the original purpose. Thus, it is more common practice in the art to unite a plurality of separate fibrous element producing devices and by one means or another attempt to combine the elements produced by these in a manner producing the least disturbance of the final product.

The uniformity of the final product is measured in a number of ways, the best known being basis weight uniformity which, as is well known, is a measure of weight per unit area and ordinarily expressed in terms of ounces per square yard. This then is a density measurement related to the major dimensions of a sheet-like structure. Variations in basis weight are frequently in excess of ±10%.

As a result of this high variation and in combination with peculiarities of the types of laydown arrangements hitherto employed, directionality of physical properties in the web machine direction vs. the cross machine direction have hitherto been considerably in excess of a desirable 1:1 ratio (directionality ratio) which would, of course, be isotropic. Indeed, so difficult has it been to avoid anisotropy, that a directional property ratio of 1.5:1 represents a maximum limiting condition of outstanding uniformity in the state of the art heretofore.

Another and obvious measure of uniformity is that of variation in web thickness but this, ordinarily, is reflected in variation in basis weight or density.

Inasmuch as the preferred form of web produced by the improved process and apparatus of the instant invention is comprised of continuous filaments laid down in random nonparallel arrangement, there must be other additional measures of interest including measuring the degree of randomness and the absence of fiber aggregates. Structures produced by the instant invention are characterized by the substantial absence of such filament aggregates and this absence may be measured by the bunching coefficient. The bunching coefficient, designated BC, is defined as the ratio of the number of "fiber spaces" occupied by fibers relative to the total number of "fiber spaces" available. In this measurement the term "fiber space" represents the average space occupied by a fiber, and is calculated by dividing a unit distance of the nonwoven sheet structure by the total number of fibers oriented in a single direction in that unit length. The bunching coefficient concept is based on the premise that where the individual fibers disposed in the same direction are uniformly spaced from each other, each "fiber space" will contain one fiber and the bunching coefficient of such a structure will be unity. In a nonwoven which contains bunched fibers, some of the "fiber spaces" will contain bundles of fibers while others will be unoccupied and the bunching coefficient of such a structure will be less than one. The greater the filament aggregation, the lower the bunching coefficient. This concept was developed by D. R. Petterson, and is described in his Ph. D. thesis, "On the Mechanics of Nonwoven Fabrics," presented to the Massachusetts Institute of Technology in 1958.

The basic equation is then:

$$B.C. = \frac{\text{Number of "fiber spaces" occupied by fibers}}{\text{Total number of "fiber spaces" available}}$$

With random fiber spacing, statistical analysis shows that the maximum value for bunching coefficient is approximately 0.87. The experimental determination is the same.

A characteristic common to the structures produced by the invention is the random disposition of the component filaments. By "random" is implied the substantial absence of any anisotropy in the arrangement of the individual filaments. In addition to the bunching coefficient, which provides an accurate and precise indication of the degree of filament separation, the randomness of filaments constituting the sheets of this invention can be further characterized by other means. One such suitable test for randomness involves cutting representative square samples one inch or greater from the sheet under consideration and then counting the number of filaments terminating at each side of the square. In a purely random sheet, the number of filaments that will be encountered along any side of the square will vary by less than 20% from the number of filaments terminating at any other side of the square, regardless of the location or orientation of the square within the plane of the sheet. In preferred sheets, substantially the same number of filaments are encountered at each side of the square. In some of the preferred sheets prepared in accordance with this invention, the average filament length within a given circle exceeds the diameter of that circle by a factor of at least about 1.2×. This permits maximum utilization of the component filaments and leads to an extremely uniform sheet.

In non-woven sheet structures of random fiber spacing the bunching coefficient will be less than unity. The instant invention produces wide webs which are characterized by bunching coefficients in excess of 0.70 and with suitable randomness.

A process for producing nonwoven webs of fibrous elements disposed in random nonparallel arrangement is described in Belgian Pat. 608,646, to Kinney. That patent describes a process in which a running multifilament bundle composed of substantially continuous synthetic organic filaments is charged electrostatically in such a manner as to separate each filament from adjacent filaments and these are thereafter collected on a receiver to form a nonwoven sheet product of the distinct type described.

The filaments may be charged by a corona discharge maintained in near vicinity, by triboelectric contact with a suitably selected guide means, or by other appropriate electrostatic methods. Ordinarily, such charging is accomplished while the filaments are under sufficient tension so that they do not separate until such tension is relieved, i.e., after they have been urged toward the receiver whereupon they immediately separate and are then collected. In a preferred embodiment, freshly-formed melt-spun synthetic organic filaments are charged and are simultaneously oriented with an aspirating jet, the action of which also serves to accelerate the charged filaments to the receiver. The output of a number of such jets may be combined to produce a wider web.

This process is, of course, also applicable to filaments other than the synthetic organic type and with minor modifications may be employed with such filaments as glass and the like. Where the selected source material is of the type that is capable of attaining the property of spontaneous elongation, prior experience teaches that a relaxing step may be applied downstream of the jet tensioning and forwarding means. This relaxing step comprises subjecting the appropriate filaments to a relaxing heat treatment at a temperature dependent upon the nature of the material such that the materials, being under appreciably no tension and subjected to the thermal conditions, relax. Subsequently, when elevated in temperature to a state in excess of the relaxing treatment temperature, these filaments will spontaneously elongate and this property of spontaneous elongation may be employed as a means of imparting additional desirable and useful aesthetic and functional properties to the end product.

It has, however, been noticed that the filaments as they leave the zone of the relaxing treatment are not always of the original substantially straight form. In particular, when working with filaments of polyethylene terephthalate this is so, and the filaments are seen to have a slightly spiral form. This is especially true when the relaxing treatment is applied by inducing hot fluid in the aspirating jet or in a closed chamber attached to the exit of such an aspirating jet. Ordinarily, this very slight spiral crimp is of no account. If there are no intervening surfaces between the heat relaxing step and the collecting web, the material lays down as desired and can be further processed in the manner taught in the Kinney patent or as is practiced in the art without any adverse results. However, in the instant case a wide web is sought by blending the output of a number of spaced parallel jets. In this case, the electrostatic and aerodynamic interactions between the cone-like dispersion patterns of the individual jets produce non-uniformities, particularly across the web due to imperfect blending of the boundaries of the patterns.

If one attempts to employ mechanical means such as surfaces physically contacting the filaments for distributing the charged filaments as part of the process of combining the plurality of apparent cone-like dispersion patterns issuing from the individual jets, severe difficulties are encountered. The initially compact continuous bundles of filaments, after being transformed to the apparent cone-like dispersion pattern which defines the outer limits or envelope for a fiber stream which bends, spirals, and buckles in a random manner within those limits or that envelope, are hopefully intermingled to fall ultimately as edge-blended patterns of filaments of uniform nature. Physical contact filament distributing surfaces are an obvious means for this purpose. Here the charge on the filaments and the apparently minor filament spiral become matters of the utmost concern. The introduction of a surface for the purpose of distributing filaments is known in the art; for example, see the patent issued to Frickert, U.S. 2,875,503, and others of its type, in which a continuous strand is projected with a substantially high axial velocity directly against a deflecting surface and the deflecting surface is oscillated to sweep the resultant laydown of filaments across a collecting surface. In the instance where charged bundles of filaments or where slightly spiral filaments are so manipulated, the product is not uniform but is characterized by an excessive number of ropey and blotchy areas or, in terms of the precise characterizing criteria discussed, the product has a low bunching coefficient and high basis weight variation. This cause and effect relationship is one of the utmost subtlety and its discovery resulted from a great deal of careful study. However, recognition of the problem did not bring with it an immediate or obvious solution. It became apparent that the distributing means to be employed must of necessity be noncontacting as to the fibrous elements. Inasmuch as both aerodynamic interactions and electrostatic interactions are involved in practicing the art of the Kinney process, hitherto known techniques were to no avail and therefore development of the techniques and arrangements of the instant invention occurred.

The instant invention is an improvement over the known prior art in that it provides novel improved process and apparatus for the formation of very wide nonwoven webs or sheets with superior uniformity, producing wide webs economically that have bunching coefficients equal to or in excess of .70, combined with a maximum basis weight variation of about ±10% and a directionality ratio of 1.5:1, or better, i.e. less; especially those webs composed of fibers exhibiting the property of spontaneous elongatability.

Accordingly, it is an object of the present invention to provide an improved and novel process and apparatus for producing nonwoven webs characterized by a high degree of uniformity. Further, it is an object to so produce a web by simple and inexpensive, yet effective, reliable means. Additionally, it is an object to lay down a nonwoven web of fibrous elements in randomly distributed nonparallel array, characterized by uniformity of basis weight and uniformity of properties measured both in the direction of machine production and across that direction in addition to the random array of the fibrous elements.

It is a still further object of the instant invention to provide improved process and apparatus for laying down webs of fibrous elements arrayed in random nonparallel arrangement, these webs being characterized by a maximum basis weight variation of no more than about ±10%, and by directionality of physical properties in the web machine direction vs. the cross machine direction of 1.5:1 or better and by a bunching coefficient greater than 0.70.

And it is a still further object to provide an arrangement combining the laydown patterns of a plurality of apparent frustoconical dispersion patterns or envelopes of fibrous elements bearing electrostatic charges of the same sign and substantial magnitude, continuously forwarded by forces including aerodynamic, into a unitary nonwoven web of wide width and uniform properties, and especially in the instance where the fibrous elements are spontaneously elongatable, to accomplish this by an arrangement utilizing means that are essentially non-contacting as to the fibrous elements.

It is another object to provide an improved arrangement for diverting a moving stream of fibrous elements carried by an elastic fluid medium into a regular moving pattern for collection.

These objectives are accomplished by the following described improved process for blending adjacent airborne streams of electrostatically charged fibrous elements into a substantially uniform web, said process comprising aerodynamically diverting or deflecting the streams to form oscillating or rotating, overlapping arcuate patterns and combining each of the patterns laid down by said adjacent streams. The arcuate patterns in one embodiment of the invention, oscillate and form two groups, each successive pattern being disposed alternately on either side of a transverse line arranged at a substantial angle, e.g. 45–90°, with respect to the line of motion of a filament attractive collecting and forwarding means, with said arcuate patterns of each group preferably arranged to overlap and be concave toward said transverse line, the oscillations of the streams being substantially uniform about lines parallel to that line of motion, partially overlapping and interlacing at least adjacent patterns within each group, and overlaying the outputs of one of the groups upon that of the other. This is accomplished by the disclosed apparatus which comprises a filament supply source capable of producing a variable plurality of discrete bundles of continuous filaments, a plurality of electrostatic charging units disposed opposite each filament bundle, a matched plurality of pneumatic forwarding and tensioning jets for directing a stream of air carrying the filaments, all disposed substantially in planar side-by-side array, each jet equipped with an oscillating aerodynamic stream diverting laydown means to produce arcuate moving stream patterns arranged alternately on either side of a transverse line at an angle with respect to the line of motion of an endless filament-attractive conveyor belt, said patterns preferably concave toward that transverse line and oscillating uniformly about lines parallel to that line of motion, the source and jets arranged serially and in spaced relationship to the endless conveyor belt which may be made filament-attractive by electrostatically charging the surface of the belt by a pinning plate in appropriately spaced relationship with the under side of the upper course of the belt. A pair of charged upright guide plates with adjustment means may be disposed at each edge of the belt and, optionally, an electrostatically charged filament pinning assembly suspended above the conveyor belt. Also optionally, cylindrical consolidating rolls are placed at one end of the belt.

In another embodiment of the invention the arcuate patterns rotate, preferably all in the same direction and in synchronism with each other so that adjacent patterns do not interfere with each other and disturb orderly laydown. All of the patterns may be disposed on the same side of a line which is transverse to the line of motion of the conveyor belt or may be arranged on alternate sides as in the case of the oscillating patterns.

The oscillating or rotating aerodynamic laydown means and stream diverting means comprise a movable grooved, stream diverting, "Coanda" or air foil element in the preferred embodiment, means for oscillating or rotating such aerodynamic laydown means, and, where the arcs of oscillation are large, means for oscillating the several laydown means on one side of the transverse line in the same rotational direction and opposite to that of the several laydown means on the other side of the transverse line.

Figure 5:
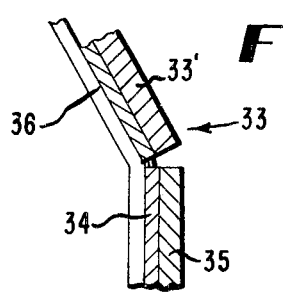
Figure 7:
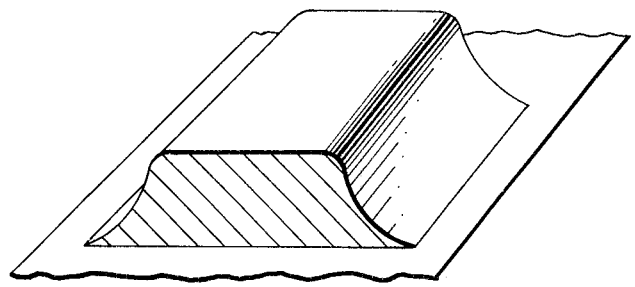
Figure 8:
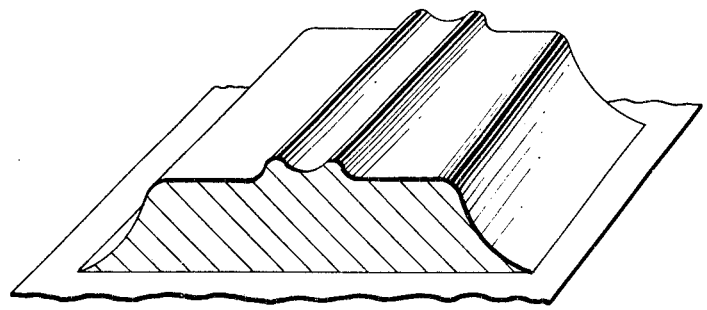
Figure 10:
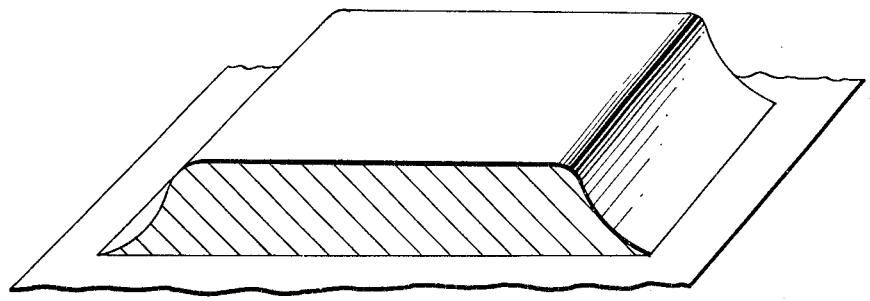

The invention will be more clearly understood and additional objects and advantages will become apparent upon reference to the discussion below and to the figures which are given for illustrative purposes and of which:

FIG. 1 is a somewhat diagrammatic isometric view of the improved laydown system of the invention and of its associated electrical circuitry, FIG. 2 is an elevational view in cross section of the pneumatic laydown means, or Coanda element of the invention, FIG. 2a is a cross sectional view on line A—A of FIG. 2 showing details thereof, FIG. 3 is a plan view of a pinning plate which may be employed in the practice of the invention, FIG. 4 is an enlarged cross sectional view showing details of the structure of the pinning plate assembly of FIG. 3, FIG. 5 is an enlarged cross sectional detail of the edge guiding means which may be employed in the practice of the invention, FIG. 6 is an isometric representation of the profile of a laydown from a single stationary jet over a moving belt, FIG. 7 is an isometric representation of a laydown of a single oscillating jet over a moving belt, FIG. 8 is a schematic representation of a theoretical summation of two adjacent oscillating jets over a moving belt, FIG. 9 is a geometric representation of the arcuate oscillation of the pneumatic laydown device of the invention, FIG. 10 is an isometric representation of the summation of two adjacent groups of patterns according to the invention, and FIG. 11 is larger scale perspective view of two stream diverting elements of this invention showing the dimensions of the arcuate pattern and deposition zone formed by the diverted streams and the overlapping area of lateral interlacing.

Referring to FIG. 1, filaments 1 spun from a plurality of side-by-side conventional spinning heads indicated by 2, with associated feeding and metering devices such as are regularly employed, not shown, are passed between electrostatic negatively-charging ion guns 3 and a rotatable grounded cylindrical conductor 4. Each ion gun is a corona discharge device of the type generally portrayed in U.S. Pat. No. 2,934,650, and comprises specifically a negative electrically charged electrode. In the present apparatus the electrode has a number of discharge points and associated shield insulating the points in spaced relationship to cylindrical guard 4. Between the point electrodes within each ion gun 3 and ground 4 a shaped intense electric field is established as a result of a corona discharge maintained between the point electrodes within ion gun 3 and ground element 4 which may be at electrical ground as previously indicated or positively charged. A negative high voltage is supplied to each ion gun 3 from a power supply 6 through connectors 7 and appropriate conductors as indicated schematically in the figure. Power supply 6 is preferably a radio frequency oscillator type commercial unit such as the Model 2040 sold by the Spellman High Voltage Company of New York, N.Y. In preferred practice, ion guns 3 are rotatable manually on pivots (not shown in the figure) so that the string-up procedure may be carried out with the least interference from the equipment. As a safety precaution, microswitch 8 may be mounted in proximity or integrally with the ion guns 3 so that the high voltage output of power supply 6 is interrupted by appropriate electrical circuitry during the period that operating personnel are in proximity with the electrodes. Cylindrical ground element 4 is rotated slowly in the direction of the arrow by gear motor 5 which is electrically controlled by appropriate means, not shown. Other appropriate safety precautions should be taken as is well known in working with high voltages. These may well include indicator light 10 and remote audible alarm 9. Appropriate circuitry may be provided so that these alarms warn of high current levels, low current levels, and momentary electrical arcs. The presence of the light should indicate that high voltage is on and the circuitry may be arranged to that the light flashes intermittently during a malfunction. It is also found practical to provide a time-delay circuit in the power supply 6 to permit voltage level adjustments before actuation of the alarm circuit. The circuitry, as a further safety precaution, may be arranged so that several adjacent positions operate as a unit, permitting safe access to any one of a group without danger of an electrical hazard on either side thereof.

Filaments 1, having passed between ion guns 3 and ground element 4, there having received a high uniform negative charge level, are passed into the entry orifices of pneumatic forwarding and tensioning jets 11. These jets may also be termed "draw jets" in that the tension established therein is sufficient to attenuate the nascent filaments. Draw jets 11 are supplied from an appropriate source of pneumatic supply, not shown, with a sufficient quantity of air in a manner regulated to provide uniform forwarding and tensioning from position to position. Alternatively, draw rolls may be utilized to attenuate the filaments and jets may be used to strip the filaments from the last draw roll and forward them toward the laydown belt. Immediately below draw jets 11 and ordinarily attached thereto are relaxing chambers 11' supplied from an appropriate source of heat transfer fluid with an adequate and controlled amount to perform the relaxing step, this supply not being shown. Attached at the exhaust ends, the lower extremities, of relaxing chambers 11' are stream diverting and filament laydown mechanisms 12. Mechanisms 12 in the embodiment shown are oscillating aerodynamic devices of air foil elements embodying the Coanda principle and providing lateral restraint to the negatively charged fibrous elements. Mechanisms 12 are actuated to oscillate with either essentially constant transverse velocity or constant angular velocity and nearly instantaneous reversal by suitable apparatus, not shown, in FIG. 1. Laydown mechanisms 12 will be described in further detail later on in this description.

Below mechanisms 12 is a moving laydown surface formed by an endless belt 13 wrapped around spaced rolls 14 and 19 and moving in the direction of the arrow. Pinning plate 20 is disposed beneath the upper course of belt 13 and is in suitable spacing therewith. Plate 20 is coupled by a connector 30 to a high voltage radio frequency oscillator power supply 21, modified by a safety interlock switch 31 and indicator light 32 for remote control of the high voltage.

A circuit is also provided to ground the supply 21 automatically when power is turned off. By this means belt 13 can be charged electrostatically positive with full safety to personnel. Belt 13 preferably is made of a partially conductive material. If a highly nonconductive material is used, a large voltage gradient develops through the belt thickness due to the presence of the web of negatively charged filaments 1 on top and positively charged pinning plate 20 underneath. If the voltage is allowed to build up between the filaments 1 and the pinning plate 20, it will discharge through the belt 13 to neutralize the charge on filaments 1. Additionally, the high voltage buildup disrupts the charge on the moving filaments 1 in the region immediately above the belt surface by causing a local breakdown, or secondary ionization, of the atmosphere thus creating bipolar ions some of which neutralize the filaments charge. As a result, the two-fold effect of high voltage buildup disrupts the laydown system.

When a partially conductive belt material is used, for example, woven nylon cord coated with appropriately compounded "Hypalon" (Du Pont's registered trademark for its synthetic rubber) or neoprene rubber, the potential on the belt 13 never builds up higher than the pinning plate 20 because charge tends to leak to rolls 14 and 19 which are grounded as schematically indicated. It should be noted that since belt 13 is in contact with the pinning plate 20 and the grounded rolls 14 and 19, the belt material must be sufficiently nonconductive to prevent excessive current leakage to the ground which might result in overloading power supply 21 and would reduce the voltage level of pinning plate 20. If the voltage level of pinning plate 20 is reduced, the laydown of filaments 1 on belt 13 may be disturbed. For maximum effect, it has also been found that belt 13 and plate 20 must be in rubbing contact so that for all practical purposes belt 13 is electrically at the same potential as plate 20. Otherwise, belt 13 will act as a shield to the positive electric field of plate 20 and will reduce the pinning effect on filaments 1.

Referring to FIGS. 3 and 4, the pinning plate 20 comprises a number of thin metallic conducting sheets 22, 22', and 22" overlaying and supported by a like number of sheets 23, 23', and 23" of insulating material. The fabrication of the unit in parts is a matter of choice and provides convenience in handling and in maintenance. To insure good electrical contact between sections of the metallic conductors 22, 22', and 22", a number of interconnecting metal strap inserts 50 are placed in appropriately machined pockets in the underlying plastic structure 23. At the juncture of pinning plate 20 and the surfaces of rolls 14 and 19, the ends of the assembly are contoured as shown. A strip 26 of insulating film such as "Mylar" (Du Pont's registered trademark for its polyester film), polyethylene, or the like, covers both ends of pinning plate assembly 20 and electrically isolates it from the grounded rolls 14 and 19.

In FIG. 3, line J—J represents an extension of the mounting plane of the draw jets 11 and associated equipment and angle α indicates the angular disposal of that equipment relative to the line of travel as shown by the center line of belt 13; preferably a substantial angle, but it may be at other angles to perform certain effects in laydown. As seen in FIG. 1, directly above belt 13 and slightly ahead of consolidating or web thickness reducing roll 27 which is in contact with roll 19, there is a static neutralizer bar 28. This bar extends the width of belt 13 and is encased in a suitable insulating or shockproof cover and is electrically connected by appropriate means to a high voltage alternating current power supply 29.

Spinning heads 2, draw jets 11, and relaxation chambers 11' are disposed essentially side-by-side in a plane which intersects belt 13 along line J—J in FIGURE 3, the angle α as described before preferably being a substantial angle as shown in the figure and as has been set forth. Oscillating pneumatic laydown devices 12 are so disposed to deposit filaments 1 in paths, or patterns of arcuate transverse cross section alternately on either side of line J and concave toward that line as initially laid down. This is indicated on belt 13 in FIGURE 1 for two swaths or strips, representative of the two groups of laydown patterns disposed the one group on one side of line J—J and the other on the other side of line J—J wherein it will be seen that the output of one group overlays that of the other. When angle α is decreased from 90°, it will be recognized that the amount of overlap or positions within a group increases, or in another way of looking at it, the effective spacing between spinning heads 2 is decreased. Sections 24 and 25 are removable metallic sections acting as parts of plates 22 and are included so that the effective pinning widths of the collecting surface in the area occupied by the initial laydown may be reduced to make a narrower width web than belt 13. When line J—J is disposed at an angle α of less than 90°, it may be necessary in some designs to offset the positions of plates 24 and 25 in the machine direction but the principle of use is still as described. Similarly, more than one such removable section may be provided at each side.

Edge guiding means 33 are provided at each edge of belt 13, only one being shown in the figure. These control the formation of the web edge and width and comprise upright plates with a hinged top portion supported and adjusted by means, not shown. Construction of edge guiding means 33 is shown more clearly in FIG. 5 wherein plate 33 is shown to comprise a sheet metal plate 34 mounted on an insulating sheet 35. The exposed face of plate 34 is covered with a sheet of insulating film 36. Both plates 33 are connected to a power supply 37 by appropriate means and are suitably charged. A hinged portion 33' is provided on each, its angular displacement being adjustable by means, not shown, to assist in edge formation control. A suitable hinge is provided. Edge control plates 33 are provided with safety features as described before including connector 41, warning light 39, and interlock switch 38. The edge guide plate, not shown, on the far side of belt 13, is similarly supplied from power supply 37 through grounding connector 40.

Elevated at approximately the level of the exit of the relaxation chamber, optionally there may be installed negatively charged wires 42 comprising one or more loops of wire and appropriate power supply and safety devices. The use of these wires 42 will be discussed later.

The swath or strip of filamentary material laid down by a stream pattern from a single stationary jet on a plane surface such as the belt 13 moving relative to the jet has a basis weight distribution from edge to edge that approximates a normal distribution curve in cross section. This is shown isometrically in FIG. 6. If the single stream laydown pattern is oscillated in some manner in the transverse machine direction, i.e., at right angles to the direction of belt travel shown by the arrows, with uniform velocity, the swath or strip laid down by the jet has uniform thickness over most of its width but tapers off to zero thickness at each edge. This is shown in FIG. 7. In FIG. 8, there is seen the result of adding two such oscillated patterns, adjacent in one group, by overlapping the tapered edges which have a normal or Gaussian distribution. It is difficult to joint the swaths or strips from laterally adjacent jets perfectly uniformly as to thickness and density. The problem then of achieving transverse web uniformity is primarily one of blending a number of adjacent swaths within one group with a number of adjacent swaths from another spaced group in a suitable manner.

It has been found in practice that overlapping and interlacing swaths formed by a group of aerodynamically oscillated streams from jets disposed on one side of the line of array of the jets laying down arcuate overlapping patterns concave toward that line and overlaying or super-imposing this output with that of another spaced group will produce composite webs that are substantially free from non-uniformities. FIG. 9 is a geometric representation of one such arcuately oscillating stream diverting and laydown device. In this figure, the threadline is discharged from the jet or relaxation chamber at point P directly above point O on the laydown surface which is moving in the direction of the arrow which may be taken as the X axis. The line J—J at right angles to it is the line of intersection of the plane in which all of the jets are arrayed and may be taken as the orthogonal Y axis. To produce an arcuate swath, the laydown pattern emerges from the relaxation chamber at point P which is elevated a distance D above belt 13, this then being the Z axis measurement, and is deflected through an angle θ. Line P–E represents the slant height of the portion of a cone generated by the fiber stream, E being the point at which the axis of the cone intersects the laydown belt 13 in the X–Y plane. P–E swings throughout the total angle φ at a given velocity which according to the invention is either substantially constant transverse velocity or constant angular velocity such that point E traces out the arc ABC with B being the mid point and line O–B coinciding with the machine direction or X axis as shown. The extreme positions are lines which might be drawn from point P to points A and C respectively. In one traverse, i.e., one-half cycle, point E moves along the arc ABC from A to C or from C to A. In order to produce a swath with a flat thickness or basis weight distribution profile across most of its width in accordance with this invention, the transverse component of the velocity of point E traversing arc ABC theoretically must be substantially constant. Assuming that fiber delivery is constant and that belt velocity is constant, the swath thickness is inversely proportional to that transverse threadline velocity. Constant angular velocity theoretically would produce a swath with a dished profile.

As has been mentioned before, line J—J is angularly disposed to the line of travel a motion of belt 13 and angle α indicates that angular disposition. Preferably, angle α is a substantial angle but it may be varied somewhat to perform certain effects in laydown. For example, the spacing of jets 11 is not necessarily a resultant from choice stemming from consideration of laydown requirements. If spinnerets 2 are large, or if other equipment necessary to spinning is bulky, the jet spacing may well depend on that factor and be too great for attainment of the proper degree of swath overlapping. In such an instance, angle α is selected to permit proper overlapping of the swaths and to effectively reduce jet spacing. We have discovered that it is necessary then to insure that the oscillating stream diverting and fibrous element laydown means operate uniformly on either side of lines parallel to the line of motion of belt 13. In FIG. 9, thus, line O–B is parallel, as indicated, to the line of belt travel, and arc AB is equal to arc BC. When we change angle α to less than 90°, we reset the relationship between gears 48 (see FIG. 2) and their actuating racks 60 so that the oscillations are as described. The stream-diverting air foil elements 12 are aligned with the belt while out of mesh, the driving racks are centered, and then the assembly is locked in mesh.

Swaths or strips that are placed upon a belt well separated from any other may be carried by the moving surface to the laydown zone of another jet where the one swath overlaps the other. In the arrangement of the instant invention, the arcuate path of one position is intersected at some point by the arcuate path of at least the nearest position of the same side of transverse line J—J. This results not only in overlapping one swath by another but in an interlacing of portions of the fibrous elements of the swaths. Some will lie under the other elements and then, on the return arcuate sweep, be brought over the same elements. This interlacing action contributes to web stability and coherence.

When arcs ABC are large, i.e. substantially greater than 90° and are concave toward line J—J, operating alternate stream diverting air foil elements 12 by a single rack as shown in FIGS. 2 and 11 becomes less than satisfactory. Since alternate air foil elements 12 are disposed on opposite sides of transverse line J—J, one rack operation drives all the gears 48 with the same rotational direction and arcs ABC on one side of transverse line J—J, at least near reversal, swing toward arcs ABC on the other side of line J—J. The air patterns in this instance may disturb orderly laydown. We therefore provide means to operate the oscillating aerodynamic stream diverting laydown devices 12 so that in the group that lays down the arcuate patterns, those on one side of line J—J rotate in the direction opposite to those in the group that lays down the arcuate patterns on the other side of line J—J. This we accomplish by providing two rack mechanisms, one for each group, along with associated electromechanical operating means for each group. The construction and use of these racks and their attendant operating means are well-known in the art and their operation will be apparent from the foregoing description.

By blending and interlacing the swath or strip of nonwoven structure laid down by one jet with the swath laid down by another jet and so on for each spinning position, uniformity may be obtained. Indeed, uniformity may be obtained by blending swaths laid down by every other jet or every third jet providing that the effective width of the swath laid down by a single position is an integral multiple of the effective jet spacing. The higher the integral multiple is, the greater is the percentage of overlays of adjacent swath and also the greater is the amount of edge which must be trimmed to waste. Thus, it is believed that it is best that a 50% overlap be used wherein the swath width is two times the effective jet spacing to yield the best uniformity consistent with the smallest amount of edge waste. Because of aerodynamic and electrostatic effects, the preferred range found in practice varies from 50% to 75% overlap. Inasmuch as the the groups of swaths are on opposite sides of line J—J, two ply-like layers are produced and may be arranged so that the hills produced by one are in line with and counteract the valleys produced by the other. For example, at a 24 inch jet belt distance, we employ jets spaced 3.37 inches apart, each laying down a 10 inch swath. The summation of these swaths appears as in FIG. 10.

We have also found that a jet belt distance in the range of 17 to 24 inches gives the best operability for the specialized conditions with which we have been working. We recognize that these dimensions are not limiting and depend on a complex relationship between jet diameter, air throughput, geometry, etc. Distances less than 15 inches are not satisfactory when electrostatic pinning of the filaments is utilized because normally air velocities at these distances are sufficient to disturb and disrupt the laydown pattern. When the filaments are pinned by suction devices under the laydown belt, distances of less than 15 inches can be used and in certain instances are desirable. If jet to belt distances are greater than 24 inches, threadline control becomes poor and laydown becomes erratic because of low air velocities.

To insure that there is uniformity in the machine direction, it is necessary that the distance advanced between successive traverses of a pneumatic laydown device is small. We also find that uniform distributions can be obtained if the angle $\theta$ is between 5° and 25°. Similarly, the oscillating or traversing speed of the individual threadlines relative to the motion of the laydown belt must be high enough to achieve the required amount of overlap and interlacing. This may be determined mathematically although it is usually easier to determine the minimum traversing speed by simple experimentation.

In practice, it is found that the range of 75 to 330 cycles per minute is sufficient to cover a range of basis weights from 1 to 5.5 ounces per square yard, but good results have been obtained with traversing oscillations up to 400 cycles per minute at a throughput of 9 to 25 grams a minute per spinning head for 12 spinning heads and a belt speed range from 4 to 15 feet per minute.

In working with fibrous elements having the property of spontaneous elongatability in the relaxed condition and with small amounts of spiral deviation from a straight line present in their structure, we have found that filament contacting mechanical oscillation elements are unsatisfactory for the reasons previously stated and have resorted to the simple and effective means illustrated in FIG. 2 and attached by suitable means, not shown, to the outlet end of relaxing chamber 11'. Basically, the system consists of a small lightweight air foil, or stream diverting element 47 mounted rigidly on a nylon gear 48 free to rotate about the jet axis on bearing 49 mounted on body 50. This gear is oscillated through an appropriate angle by a rack, shown in section at 60 in FIG. 2, reciprocating wtih a regulated velocity by means, not shown, to impart constant transverse velocity or constant angular velocity to the laid down swath. These air foil devices, or stream diverting elements, are disposed on either side of alternate jets.

Attempts to employ a fully enclosed tube or channel as the aerodynamic device met with failure because of excessive ropiness of the emitted filaments and sticking. This roping does not take place when the noncontacting aerodynamic device or air foil is the oscillating device having the open curved channel as disclosed which also may be termed a "Coanda" element because it makes use of the principle of aerodynamics known as the Coanda effect.

This principle, named for its discoverer, Henri Coanda, was first applied to a useful structure as described in U.S. 2,052,869. It describes structure for controlling the discharge into an elastic fluid atmosphere of a stream of another elastic fluid moving at high velocity wherein there are means for checking the flow induced in the atmosphere by the moving stream on one side of the line of discharge. One aspect of the present invention involves a modification and utilization of this principle in a novel arrangement to attain a new and useful result.

Essentially, the jet as it issues from its conduit 11' carrying along with it the filaments 1 flows through an asymmetric nozzle 43 of which one wall 44 is real and the other fictitious, being formed by the ambient atmosphere. The jet, because of its velocity, is at a pressure lower than that of the surrounding air which enables the jet to act on the surrounding air and induce it, not only by surface friction, i.e., fluid shear, but also through pressure difference to flow toward the real wall or bottom 44 of channel or groove 45 in a manner essentially perpendicular to that wall, causing the filaments to follow around the curvature essentially without touching the surface to thus divert the stream of fluid carrying the filaments from its initial line of direction. As the kinetic energy of the jet is transferred to the momentum of the ambient air, the filaments separate from proximity to the wall 44 and are borne downward in the induced flow of the large slower moving mass of secondary air under the influence of that flow combined with electrostatic and gravitational forces. Superimposed on this action, of course, is the result of the induced constant transverse velocity oscillation of the stream diverting element previously described. Lateral restraint is provided and this we accomplish by providing a channel or grooving the curve of the air foil element surface. This may be done in a manner such that the depth 51 of the groove 45 is at least half the width and if more, the sides are vertical, blending with the circular-arcuate groove bottom 44 with substantially no re-entrant angle.

In operation a plurality of polymeric filaments 1 continuously melt spun from conventional spinning equipment 2 are passed between the ion guns 3 and the electrically grounded conductor 4. The guns 3 have been previously pivoted into a near-vertical position to facilitate string-up. In doing so, the high voltage power to the guns 3 is shut off by microswitches 8. The filaments 1 are spread in a substantially single layer along the conductor 4 surface as discrete bundles opposite each ion gun 3. Gear motor 5 slowly rotates the conductor 4 to provide a clean, new surface to the filaments 1 during operation. After the leading ends of the filaments 1 have been aspirated into the draw jets 11 from where they are subsequently impinged on the moving belt 13, the ion guns 3 are pivoted into the operating position. The filaments 1 are then impressed with a high level, negative electrostatic charge. During the interval that a bundle of filaments 1 passes through a draw jet 11, the charge keeps the filaments 1 separated and prevents interlacking and "roping." From jets 11, filaments 1 pass into relaxation chamber 11' and are thermally treated therein. Thence the filaments 1 are distributed into overlapping moving stream patterns and deposition zones by elements 12. These patterns or zones preferably have a minor dimension W and a major dimension L both transverse to direction of movement of the filaments as shown in FIG. 11.

A highly randomized pattern as to filament dispositions is effected with uniform distribution when oscillating mechanisms 12 are used to splay the filaments 1 onto the moving belt 13 in a cross lapping pattern. As the filament 1 impinge on the belt 13, they are forcibly pinned to the surface by the powerful attractive force of the positive-charged pinning plate 20. To further control the laydown pattern of the filaments 1, guide plates 33, negative charged, set up auxiliary electrostatic fields which tend to repel and direct the filaments 1. The auxiliary electric fields of plates 33 can be modified or varied by the adjusting angular position of the hinged portions 33' as well as the attitude and location of plates 33. Thus, it is possible to form a nonwoven web with minimum selvedge trim and which possesses a substantially uniform weight distribution.

Additional control of laydown pattern can be achieved with suction devices placed below the belt. Suction offers several advantages in the deposition process, including modification of filament deposition, and isotropy of filament arrangement in the web.

The weight of web produced can be altered by changing the speed of the moving belt 13; i.e., the rate at which the newly formed web is removed from the laydown zone. This speed can be varied from 1 to at least 54 yards per minute. Webs 78 inches wide to 150 inches wide, and at least 1 ounce per square yard in weight are produced. The moving belt 13 transfers the "pinned" web from the laydown zone into a pair of grounded rolls 19 and 27 where it is consolidated and then removed for later end use processing.

When a heavier weight web is formed, the top layers of the filaments 1 are not as tightly "pinned" to the belt 13 as the bottom layers. These surface filaments 1 tend to billow up in the laydown area due to the reduced pinning effect and the air flow from the jets so that when the web is advanced they leap toward the roll 27. This condition destroys the laydown uniformity and produces an inferior product. To eliminate this condition, the network of negative charged wires 42 are then suspended above the laydown area and a second auxiliary electrostatic field is established that pins the loose filaments 1 to the web. Static neutralizer 28 directly above the web and in front of roll 27 eliminates the leaping of filaments 1 by removing the negative charge from the surface of the web.

Webs so made have a uniformity range of about ±10% or better, bunching coefficient of greater than 0.70, and a directional ratio of 1.5:1 or less in a range of basis weights from 1 ounce per square yard to 5.5 ounces per square yard, and are useful in a vast range of products. When subjected to further treatment such as bonding the structure for reasons of integrity, embossing to impart aesthetic appearance and the like, they make excellent and superior substrates for coated fabrics to cite one example. Many other uses will be apparent to those working in the field who have long sought improved process and apparatus to achieve the results now possible.

We claim:

1. An improved process for diverting in a regular pattern a moving stream comprising a plurality of continuous filaments dispersed in an elastic fluid medium, said process comprising directing a moving stream of an elastic fluid medium carrying a plurality of continuous filaments dispersed therein, downward through a first position in an initial line of direction into an elastic fluid atmosphere, controlling the transverse cross-section of the stream, and aerodynamically laterally diverting the stream by directing said stream into said atmosphere through a downwardly open channel having a surface smoothly diverging from said initial line, there being a flow of the fluid atmosphere induced by said directing step, said flow being checked at a position being continuously moved in an arcuate path around the initial line of direction of said stream to form an uniformly diverging pattern substantially in the configuration of at least a portion of a conical surface.

2. An improved apparatus for diverting and oscillating a moving stream comprising a plurality of fibrous elements dispersed in and carried by an elastic fluid medium into a regular pattern, said apparatus comprising, in combination, a first means for directing a moving stream of fibrous elements dispersed in and carried by an elastic fluid medium downward through a first position in an initial line of direction into an elastic fluid atmosphere, and a second means aligned with and cooperating with said first means for aerodynamically diverting the moving stream laterally of the initial line of direction in a diverging moving pattern, said second means comprising a movable element mounted adjacent said first means for arcuate movement around the initial line of direction of said stream, a drive mechanism operatively connected to said element to displace said element continuously in an arcuate path, said movable element having an unenclosed downwardly facing contoured surface sloping gradually from the initial line of direction of the moving stream to check, at an arcuately displaced position around the initial line of direction of the stream, the flow of the elastic fluid atmosphere induced by directing the stream of elastic fluid medium and fibrous elements into the elastic fluid atmosphere, and cause the pattern formed by the laterally diverted stream to take the form of at least a portion of a conical surface.

3. The apparatus of claim 2 in which said movable element is provided with a continuous elongated surface having a first portion generally aligned with the initial line of direction of the stream in a tangential relation to the stream and positioned adjacent said first means, said surface having a second portion joined to said first portion and extending therefrom to a point spaced along the initial line of direction from said first means and spaced laterally from the initial line of direction of the stream, said surface arranged to instantaneously shield one side of the moving stream from the induced flow of the elastic atmosphere caused by directing the stream into the atmosphere so that the said induced flow of the elastic atmosphere exerts a laterally directed force upon the stream from the other side to divert the stream from the initial line of direction.

4. The apparatus of claim 3 in which said continuous elongated surface of said movable element forms an open channel, said channel at the first portion of the surface positioned tangentially to the stream in alignment with the initial line of direction of the stream and smoothly diverging from the initial line to the second portion of the surface at the point spaced laterally from the initial line of direction of the stream.

References Cited

UNITED STATES PATENTS

| | | | |
|---|---|---|---|
| 1,915,451 | 6/1933 | Schur | 226—97 XR |
| 1,947,752 | 2/1934 | Benesh | 239—523 |
| 2,854,059 | 9/1958 | Palmer | 226—97 XR |
| 2,881,906 | 4/1959 | Griset | 226—7 |
| 2,971,683 | 2/1961 | Paulsen | 226—97 |
| 2,981,999 | 5/1961 | Russell. | |
| 3,172,184 | 3/1965 | Salteri et al. | |
| 3,314,840 | 4/1967 | Lloyd et al. | |

FOREIGN PATENTS 242,895   1/1963   Canada.

OTHER REFERENCES

German printed application 1,083,607, June 15, 1960, Becht et al.

ROBERT R. MACKEY, Primary Examiner

U.S. Cl. X.R.

226—97; 28—1; 137—81.5; 239—523